United States Patent
Okubo (10) Patent No.: US 7,342,610 B2
(45) Date of Patent: Mar. 11, 2008

(54) COLOR BALANCE ADJUSTMENT OF IMAGE SENSED UPON EMITTING FLASH LIGHT

(75) Inventor: Toshiyuki Okubo, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 840 days.

(21) Appl. No.: 10/647,042

(22) Filed: Aug. 22, 2003

(65) Prior Publication Data

US 2004/0075762 A1  Apr. 22, 2004

(30) Foreign Application Priority Data

Aug. 23, 2002 (JP) ............................. 2002-243842

(51) Int. Cl.
    *H04N 5/222* (2006.01)
(52) U.S. Cl. .................... 348/371; 348/223.1; 348/370
(58) Field of Classification Search ................ 348/655, 348/224.1, 225.1, 223.1, 371
    See application file for complete search history.

(56) References Cited

U.S. PATENT DOCUMENTS

| | | | |
|---|---|---|---|
| 5,565,990 A * | 10/1996 | Hosoi et al. ................ 356/406 |
| 5,568,187 A | 10/1996 | Okino ..................... 348/224.1 |
| 5,568,194 A * | 10/1996 | Abe ........................ 348/223.1 |
| 5,617,139 A | 4/1997 | Okino ..................... 348/223.1 |
| 5,808,681 A * | 9/1998 | Kitajima .................... 348/371 |
| 6,529,235 B1 * | 3/2003 | Tseng ...................... 348/223.1 |
| 6,693,673 B1 * | 2/2004 | Tanaka et al. ............... 348/371 |
| 6,734,895 B1 * | 5/2004 | Uehara et al. ................ 348/79 |
| 6,788,812 B1 * | 9/2004 | Wilkins ..................... 382/167 |
| 6,989,859 B2 * | 1/2006 | Parulski .................... 348/223.1 |
| 7,002,624 B1 * | 2/2006 | Uchino et al. ........... 348/225.1 |
| 7,009,641 B2 * | 3/2006 | Takahashi ................ 348/223.1 |
| 7,148,922 B2 * | 12/2006 | Shimada .................. 348/224.1 |
| 7,158,174 B2 * | 1/2007 | Gindele et al. .......... 348/224.1 |
| 7,176,962 B2 * | 2/2007 | Ejima ...................... 348/208.4 |

FOREIGN PATENT DOCUMENTS

JP    8-17498 A    2/1996

* cited by examiner

*Primary Examiner*—David Ometz
*Assistant Examiner*—Pritham D. Prabhakher
(74) *Attorney, Agent, or Firm*—Morgan & Finnegan, LLP (57) ABSTRACT

In a method of controlling an image sensing apparatus, which has an image sensing device, a flash light used to illuminate an object with light, and a shutter switch, when an image sensing instruction is issued upon depression of the shutter button, an image is sensed using the flash. Then, a color temperature for processing the sensed image is calculated using at least color temperature information of the sensed image. The sensed image is processed based on the calculated color temperature.

8 Claims, 8 Drawing Sheets

COLOR BALANCE ADJUSTMENT OF IMAGE SENSED UPON EMITTING FLASH LIGHT

FIELD OF THE INVENTION

The present invention relates to an image sensing apparatus for sensing, recording, and reproducing a still image and moving image, and an image sensing apparatus control method.

BACKGROUND OF THE INVENTION

Image sensing apparatuses such as digital cameras and the like, which record and reproduce still images and moving images using a memory card having a solid-state memory element as a recording medium are already commercially available, and digital cameras having an auto white balance function are also commercially available.

With these digital cameras, a digital camera user can take an image regardless of the color temperature of a light source with which an object is irradiated. When a flash light is used to illuminate an object upon sensing an image, there are two different light sources, i.e., external light and flash light upon emitting flash light. At this time, the color temperatures of external light and flash light are independently detected. Then, white balance is determined from the influences of the color temperatures of external light and flash light based on the ratio of irradiation luminance.

Such conventional image sensing apparatus such as a digital camera or the like, holds a fixed value of the color temperature of the flash light as a designed value or stores a color temperature obtained by emitting the flash light upon individual adjustment of the image sensing apparatus at the time of production in a factory.

However, the color temperature of the flash light changes depending upon an emission amount, and repeated emission causes variation in the color temperature. As a result, the actual color temperature of the flash light varies for each emission of the flash light. If the actual color temperature largely differs from the stored fixed value or individual adjustment value, the color balance of a sensed image does not coincide with the actual color temperature.

Further, when the distance between the camera and object is long, since importance is attached to the color temperature of flash light even when the ratio of external light is large, a sensed image suffers inappropriate color balance.

SUMMARY OF THE INVENTION

The present invention has been made in consideration of the above situation, and has as its object to attain appropriate color balance correction of a sensed image when an image sensing is made while emitting flash light.

According to the present invention, the foregoing object is attained by providing a method of controlling an image sensing apparatus, which has an image sensor, a flash light used to illuminate an object with light, and an image sensing instruction unit, comprising: sensing a first image while causing the flash light to emit light in response to an image sensing designation by the image sensing instruction unit; calculating a color temperature for processing the first image using at least color temperature information of the first image.

According to the present invention, the foregoing object is also attained by providing a controller for an image sensing apparatus, which has an image sensor, a flash light used to illuminate an object with light, and an image sensing instruction unit, comprising: a first image sensing controller which controls to sense a first image while causing the flash light to emit light in response to an image sensing designation by the image sensing instruction unit; a color temperature calculation unit which calculates a color temperature for processing the first image using at least color temperature information of the first image.

Further, the foregoing object is also attained by providing an image sensing apparatus including the above controller.

Other features and advantages of the present invention will be apparent from the following description taken in conjunction with the accompanying drawings, in which like reference characters designate the same or similar parts throughout the figures thereof.

BRIEF DESCRIPTION OF THE DRAWINGS

The accompanying drawings, which are incorporated in and constitute a part of the specification, illustrate an embodiment of the invention and, together with the description, serve to explain the principles of the invention.

DETAILED DESCRIPTION OF THE PREFERRED EMBODIMENT

A preferred embodiment of the present invention will now be described in detail in accordance with the accompanying drawings.

Figure 1:
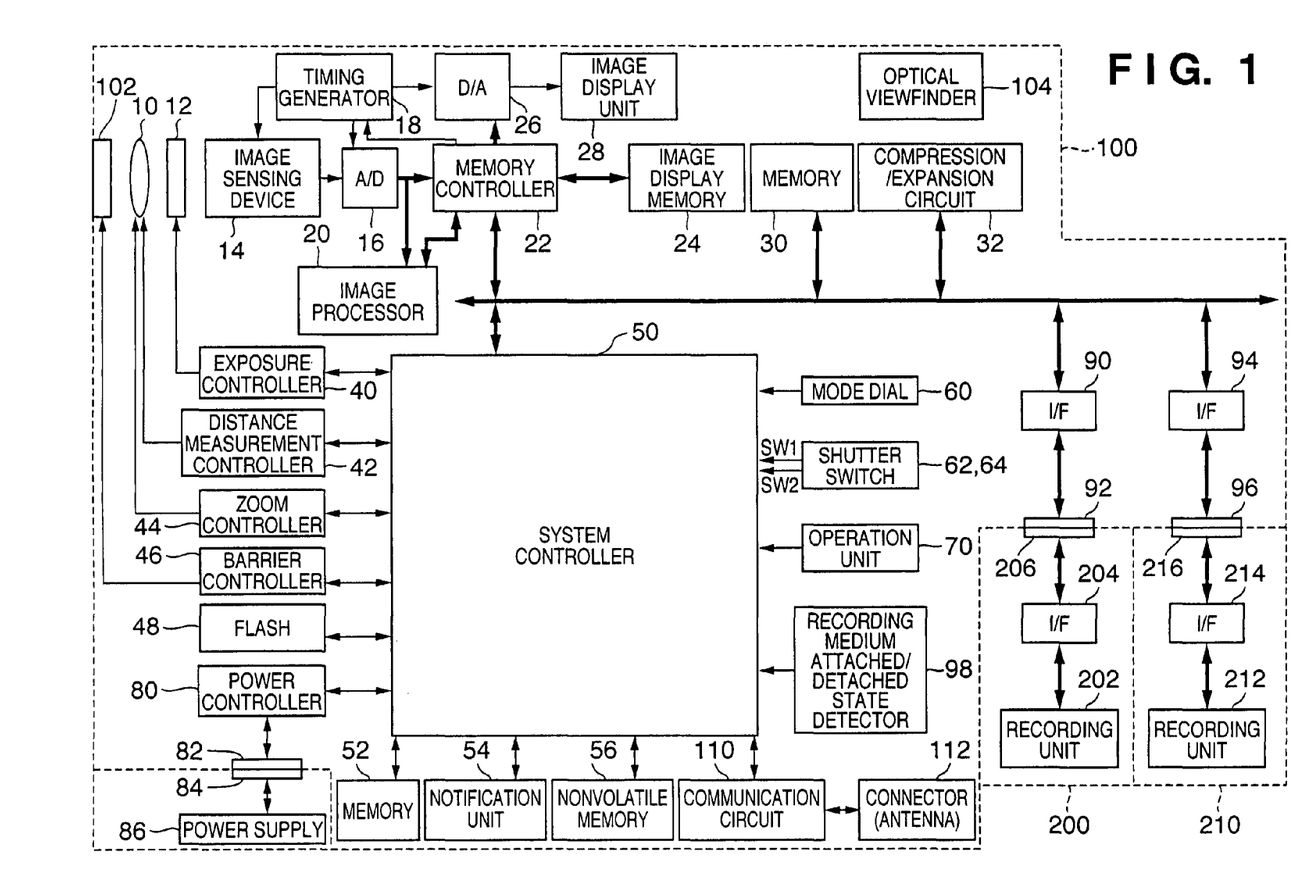
FIG. 1 is a block diagram showing the arrangement of an image sensing apparatus according to an embodiment of the present invention.

FIG. 1 is a block diagram showing the arrangement of an image sensing apparatus with an image processing function according to an embodiment of the present invention.

Referring to FIG. 1, reference numeral 100 denotes an image sensing apparatus. Reference numeral 10 denotes an image sensing lens; 12, a shutter having a diaphragm function; 14, an image sensing device which converts an optical image into an electrical signal; and 16, an A/D converter which converts an analog signal output from the image sensing device 14 into a digital signal.

Reference numeral 18 denotes a timing generator which supplies a clock signal and control signal respectively to the A/D converter 16 and a D/A converter 26 under the control of a memory controller 22 and system controller 50.

Reference numeral 20 denotes an image processor which executes a predetermined pixel interpolation process and color conversion process for data output from the A/D converter 16 or memory controller 22. The image processor 20 executes a predetermined calculation process using image data output from the A/D converter 16. Based on the obtained calculation result, the system controller 50 executes a through-the-lens (TTL) auto focus (AF) process, auto exposure (AE) process, and pre-flash (EF) process with respect to an exposure controller 40 and distance measurement controller 42. Furthermore, the image processor 20 executes a predetermined calculation process using image data output from the A/D converter 16, and also executes a TTL auto white balance process (AWB) on the basis of the obtained calculation result.

The memory controller 22 controls the A/D converter 16, the timing generator 18, the image processor 20, an image display memory 24, the D/A converter 26, a memory 30, and a compression/expansion circuit 32. Image data output from the A/D converter 16 is written in the image display memory 24 or memory 30 via the image processor 20 and memory controller 22 or via the memory controller 22 alone.

Reference numeral 24 denotes the image display memory; 26, the D/A converter; and 28, an image display unit which comprises a TFT LCD or the like. Image data to be displayed written in the image display memory 24 is displayed on the image display unit 28 via the D/A converter 26. An electronic viewfinder function can be realized by sequentially displaying sensed image data using the image display unit 28. The image display unit 28 arbitrarily turns on/off its display in accordance with an instruction from the system controller 50. If the display is turned off, the power consumption of the image sensing apparatus 100 can be greatly reduced.

The memory 30 is used to store sensed still images and moving images. The memory 30 has a storage capacity which is large enough to store a predetermined number of still images and a moving image/images for a predetermined period. In a sequential-shot image sensing mode for sequentially sensing a plurality of still images or a panoramic image sensing mode, large-size image data can be written in the memory 30 at a high speed.

The memory 30 can also be used as a work area of the system controller 50.

The compression/expansion circuit 32 compresses or expands image data by adaptive discrete cosine transformation (ADCT) or the like. The compression/expansion circuit 32 reads image data stored in the memory 30, executes a compression or expansion process on the read image data, and writes the processed data in the memory 30 again.

The exposure controller 40 controls the shutter 12 having the diaphragm function. The exposure controller 40 also has a flash adjusting function in collaboration with a flash 48. The distance measurement controller 42 controls focusing of the image sensing lens 10. Reference numeral 44 denotes a zoom controller which controls zooming of the image sensing lens 10; and 46, a barrier controller which controls the operation of a barrier 102. The flash (flash device) 48 also has an AF auxiliary light projection function, and a flash adjusting function used to illuminate an object with light. The system controller 50 controls the exposure controller 40 and distance measurement controller 42 by the TTL method on the basis of the result of calculations by the image processor 20 using image data output from the A/D converter 16.

The system controller 50 controls the overall image sensing apparatus 100. Reference numeral 52 denotes a memory which stores constants, variables, programs, and the like required to operate the system controller 50.

Reference numeral 54 denotes a notification unit which notifies an external apparatus of operation status, messages, and the like using characters, images, sound, and the like in accordance with the execution state of a program in the system controller 50. For example, the notification unit 54 comprises a combination of one or more devices of display devices including an LCD and LEDs for visual notification, and sound generating devices for audible notification. Especially, the display device or devices is/are provided at one or a plurality of visually recognizable positions near around an operation unit 70. Further, some functions of the notification unit 54 are provided within an optical viewfinder 104.

Of the display contents of the notification unit 54, those to be displayed on the LCD or the like include indications of single-/sequential-shot image sensing, a self timer, a compression rate, the number of recordable pixels, the number of recorded images, the number of recordable images, a shutter speed, an f-number (aperture value), exposure compensation, flash illumination, pink-eye effect mitigation, macro image sensing, a buzzer-set state, a timer battery level, a battery level, an error state, information using plural digit numbers, attached/detached state of recording media 200 and 210, operation of a communication I/F, and date and time.

Of the display contents of the notification unit 54, those to be displayed within the optical viewfinder 104 include indications of an in-focus state, camera shake warning, a flash charge state, a shutter speed, an f-number, exposure compensation, and the like.

Reference numeral 56 denotes an electrically erasable and recordable nonvolatile memory such as an EEPROM or the like.

Reference numerals 60, 62, 64, and 70 denote operation means for inputting various operation instructions to the system controller 50. These operation means comprise a combination of one or a plurality of switches, dials, a touch panel, a pointing device by means of line-of-sight detection, a speech recognition device, and the like.

Next, these operation means will be described in more detail below.

Reference numeral 60 denotes a mode dial switch for switching various function modes such as a power OFF mode, automatic image sensing mode, program image sensing mode, panoramic image sensing mode, reproduction mode, multi-image reproduction/deletion mode, PC connection mode, and the like.

Reference numeral 62 denotes a shutter switch SW1, which is turned on upon depressing a shutter button (not shown) to its half-stroke position, and instructs to start operations such as an AF process, AE process, AWB process, EF process, and the like.

Reference numeral 64 denotes a shutter switch SW2, which is turned on upon depressing the shutter button (not shown) to its full-stroke position, and instructs to start a series of processes including an exposure process for writing a signal read out from the image sensing device 14 in the memory 30 as image data via the A/D converter 16 and memory controller 22, a development process using calculations in the image processor 20 and memory controller 22, and a recording process for reading out image data from the memory 30, compressing the readout image data by the compression/expansion circuit 32, and writing the compressed image data in the recording medium 200 or 210.

Reference numeral 70 denotes an operation unit which comprises various buttons and a touch panel. The operation unit 70 includes a menu button, set button, macro button, multi-image reproduction/repaging button, flash set button, single-shot/sequential-shot/self-timer select button, forward (+) menu item select button, backward (−) menu item select button, forward (+) reproduction image search button, backward (−) reproduction image search button, image sensing quality select button, exposure correction button, date/time set button, and the like.

Reference numeral 80 denotes a power controller which comprises a battery detection circuit, DC-DC converter, a switch circuit used to select a block to be energized, and the like. The power controller 80 detects the attached/detached state of the battery, battery type, and remaining battery power level, controls the DC-DC converter on the basis of the detection results and an instruction from the system controller 50, and supplies required voltages to respective units including the recording medium for a required period of time.

Reference numerals 82 and 84 denote connectors; and 86, a power source which comprises a primary battery such as an alkaline battery, lithium battery, or the like, a secondary battery such as an NiCd battery, NiMh battery, Li-ion battery, or the like, an AC adapter, and the like.

Reference numerals 90 and 94 denote interfaces with recording media such as a memory card, hard disk, and the like; 92 and 96, connectors for connecting with the recording media such as a memory card, hard disk, and the like; and 98, a recording medium attached/detached state detector for detecting whether or not the recording medium 200 and/or the recording medium 210 are/is attached to the connector 92 and/or the connector 96. The recording medium attached/detached state detector 98 can also detect whether or not various communication cards and the like (to be described later) are attached, in addition to the recording medium 200 or 210.

In the above description, this embodiment employs two systems of interfaces and connectors for connecting recording media. However, the number of systems is not limited, and one or a plurality of interfaces and connectors for connecting recording media may be employed. Further, interfaces and connectors pursuant to different standards may be combined.

As the interfaces and connectors, those which comply with the PCMCIA (Personal Computer Memory Card International Association) card standards, CF (Compact Flash) card standards, and the like may be used.

Furthermore, when interfaces and connectors, which comply with the PCMCIA card standards, CF card standards, or the like, are used as the interfaces 90 and 94 and the connectors 92 and 96, image data and management information attached to the image data can be exchanged with other computers and peripheral devices such as a printer and the like by connecting various communication cards such as a LAN card, modem card, USB card, IEEE1394 card, P1284 card, SCSI card, PHS card, and the like.

The barrier 102 serves as a protection device, which covers the image sensing portion including the lens 10 of the image sensing apparatus 100 to protect it from being contaminated or damaged.

The optical viewfinder 104 can be used to sense an image without using an electronic viewfinder function provided by the image display unit 28. Within the optical viewfinder 104, some functions of the notification unit 54, e.g., an in-focus state, camera shake warning, flash charge, shutter speed, f-number, exposure correction, and the like are displayed.

Reference numeral 110 denotes a communication circuit which has various communication functions such as RS232C, USB, IEEE1394, P1284, SCSI, modem, LAN, wireless communications, and the like.

Reference numeral 112 denotes a connector or antenna (in case of a wireless communication) for connecting the image sensing apparatus 100 with another apparatus via the communication circuit 110.

The recording medium 200 comprises a memory card, hard disk, or the like. The recording medium 200 has a recording unit 202 which comprises a semiconductor memory, magnetic disk, or the like, an interface 204 with the image sensing apparatus 100, and a connector 206 for connecting with the image sensing apparatus 100. Also, the recording medium 210 comprises a memory card, hard disk, or the like. The recording medium 210 has a recording unit 212 which comprises a semiconductor memory, magnetic disk, or the like, an interface 214 with the image sensing apparatus 100, and a connector 216 for connecting with the image sensing apparatus 100.

The operation of the image sensing apparatus 100 with the above arrangement according to the embodiment of the present invention will be described below with reference to FIGS. 2 to 8.

Figure 2:
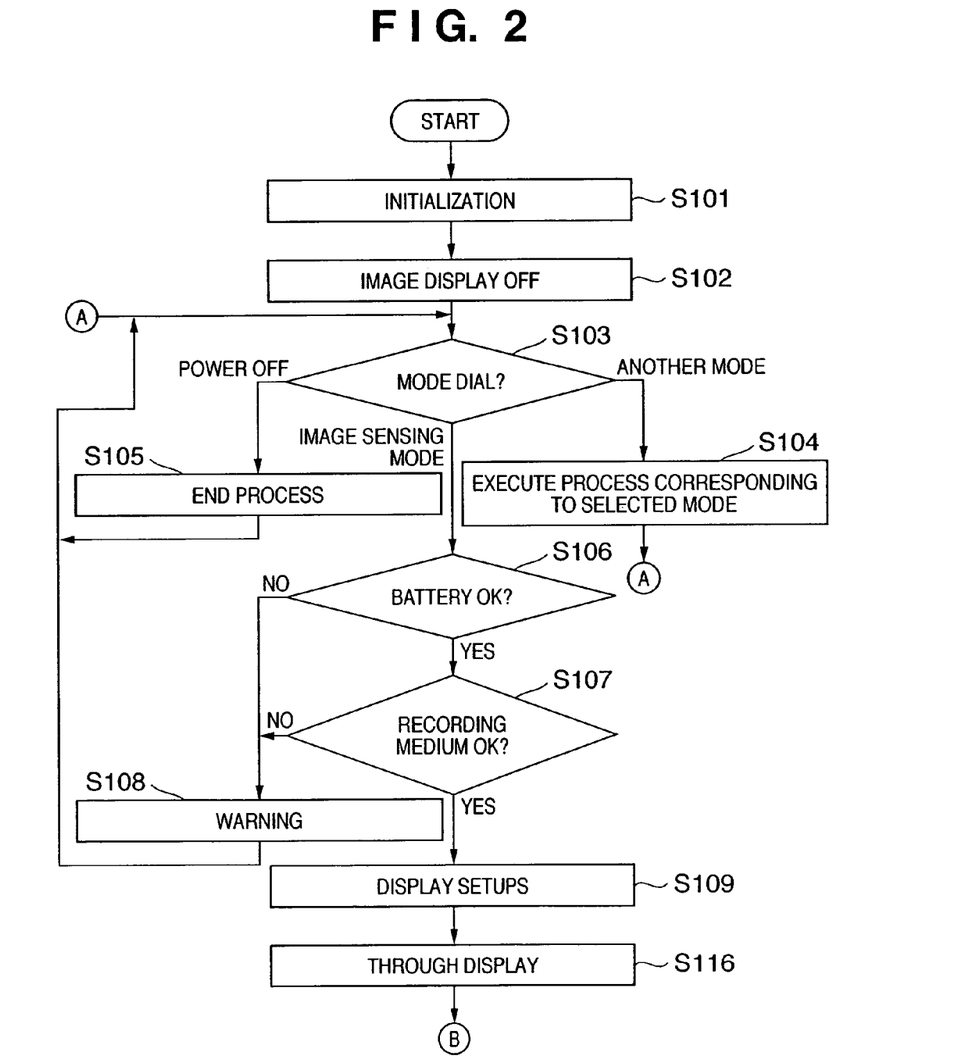
FIG. 2 is a flow chart showing a part of a main routine according to the embodiment of the present invention.
Figure 3:
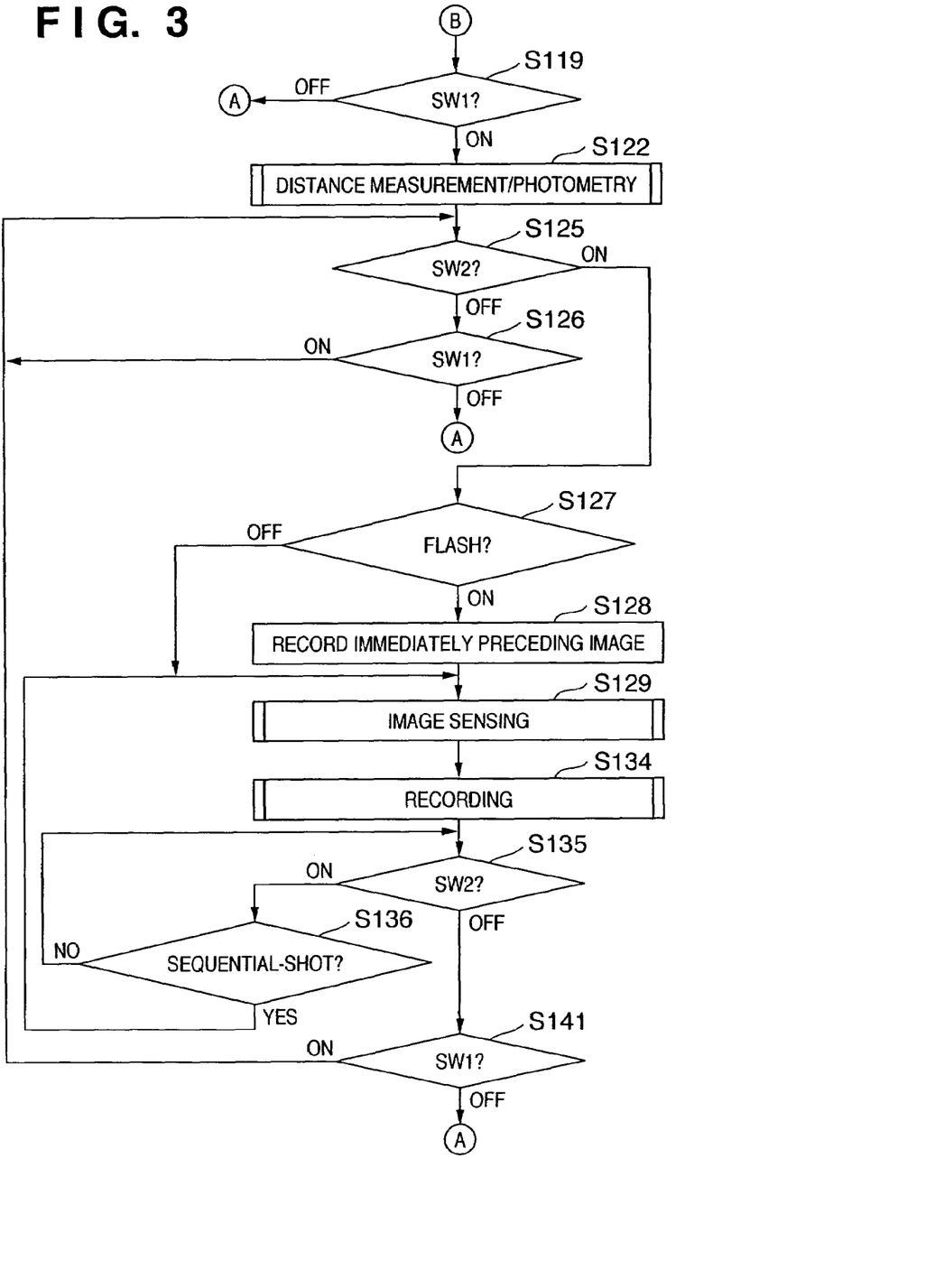
FIG. 3 is a flow chart showing a part of the main routine according to the embodiment of the present invention.

FIGS. 2 and 3 are flow charts of the main routine of the image sensing apparatus 100 of this embodiment.

Referring to FIG. 2, upon power ON after, e.g., battery exchange, the system controller 50 initializes flags, control variables, and the like (step S101), and disables image display of the image display unit 28 as an initial state (step S102). In step S103, the system controller 50 checks the setting position of the mode dial 60. If the mode dial 60 is set at the power OFF mode position, the system controller 50 executes a predetermined end process (step S105). In this process, the system controller 50 changes display of the respective display units to an end state, closes the barrier 102 to protect the image sensing portion, records necessary parameters including flags, control variables, and the like, setup values, and setup mode in the nonvolatile memory 56, and controls the power controller 80 to shut off unnecessary power supplies to the respective units of the image sensing apparatus 100 including the image display unit 28. After that, the flow returns to step S103.

If it is determined in step S103 that the mode dial 60 is set at the image sensing mode position, the flow advances to step S106.

On the other hand, if it is determined in step S103 that the mode dial 60 is set at another mode position, the system controller 50 executes a process corresponding to the selected mode (step S104). Upon completion of the process, the flow returns to step S103. The miscellaneous modes in step S104 include, e.g., an image confirmation mode. In this mode, index images are displayed to confirm sensed images, and modification, retouching, filing, and the like of acquired images can be done.

The system controller 50 determines using the power controller 80 in step S106 whether or not the remaining level and operation status of the power source 86 cause problems in the operation of the image sensing apparatus 100. If any problems are found (NO in step S106), a predetermined warning message is visually and/or audibly generated using the notification unit 54 (step S108). The flow then returns to step S103.

On the other hand, if the power source 86 has no problem (YES in step S106), the system controller 50 determines in step S107 whether or not the operation status of the recording medium 200 or 210 causes problems in the operation of the image sensing apparatus 100, especially, the recording/reproduction operation of image data to/from the recording medium 200 or 210. If any problems are found (NO in step S107), a predetermined warning message is visually and/or audibly generated using the notification unit 54 (step S108). The flow then returns to step S103.

If the operation status of the recording medium 200 or 210 has no problem (YES in step S107), the system controller 50 visually and/or audibly notifies various setup states of the image sensing apparatus 100 using the notification unit 54 (step S109). Note that the system controller 50 may enable image display of the image display unit 28, and visually and audibly notify various setup states of the image sensing apparatus 100 using the image display unit 28.

In step S116, the system controller 50 enables image display of the image display unit 28 and sets it in a through display mode to sequentially display sensed image data. The flow then advances to step S119 in FIG. 3. In the through display mode, data, which is sequentially written in the image display memory 24 via the image sensing device 14, A/D converter 16, image processor 20, and memory controller 22, is sequentially displayed on the image display unit 28 via the memory controller 22 and D/A converter 26, thus implementing an image monitor function.

If it is determined in step S119 that the shutter switch SW1 is OFF, the flow returns to step S103. If the shutter switch SW1 is ON, the flow advances to step S122. The system controller 50 executes a distance measurement process to adjust the focal point of the image sensing lens 10 to an object, and also a photometry process to determine an aperture value and shutter speed (step S122). As a result of photometry, the system controller 50 sets a flash flag if necessary to use the flash. Details of the distance measurement/photometry process in step S122 will be described later with reference to FIG. 4.

Upon completion of the distance measurement/photometry process (step S122), the flow advances to step S125. If the shutter switch SW2 is OFF and the shutter switch SW1 is canceled (step S126), the flow returns to step S103. If the shutter switch SW2 is ON (step S125), the system controller 50 checks if the flash flag is set as a result of the photometry process in step S122 (step S127). If the flash flag is set, i.e., if an image must be sensed while emitting flash light, the system controller 50 records a through display image as an immediately preceding image in step S128.

In the present invention, the immediately preceding image recorded in this step is used in a white balance process executed in step S402 (will be described later). By obtaining the color temperature of external light and the ratio of brightness between the external light and flash light from this immediately preceding image, appropriate color balance of an image sensed upon emitting flash light can be obtained. Note that the brightness can be, e.g., light amounts, light levels (Y), AE values, or combination thereof. The processes from capture of this immediately preceding image until an actual image sensing process will be described in detail later with reference to the timing chart of FIG. 8.

On the other hand, if an image is to be sensed without emitting flash light, since no process using the immediately preceding image is required, the flow jumps from step S127 to step S129.

In step S129, the system controller 50 executes an image sensing process that includes an exposure process for writing sensed image data in the image data memory 30 via the image sensing device 14, A/D converter 16, image processor 20, and memory controller 22 or directly from the A/D converter 16 via the memory controller 22, and a development process for reading out image data written in the image data memory 30 using the memory controller 22 and image processor 30 as needed, and executing various processes. Details of the image sensing process in step S129 will be described later using FIG. 5.

Upon completion of the image sensing process, the flow advances to step S134, and the system controller 50 executes a recording process (step S134). In this process, the system controller 50 reads out sensed image data written in the image data memory 30, and executes various image processes for the readout image data using the memory controller 22 and image processor 20 as needed. Also, the system controller 50 executes an image compression process according to the set mode using the compression/expansion circuit 32. After that, the system controller writes the image data on the recording medium 200 or 210. Details of the recording process in step S134 will be described later using FIG. 6.

Upon completion of the recording process (step S134), if the shutter switch SW2 is kept ON (step S135), the system controller 50 checks a sequential-shot flag stored in its internal memory or the memory 52 (step S136). If the sequential-shot flag is set, the flow returns to step S129 to sequentially execute the image sensing process, thus sensing the next image.

On the other hand, if the sequential-shot flag is not set (NO in step S136), the flow returns to step S135 to repeat the current process until the shutter switch SW2 is released.

If the shutter switch SW2 is released, the state of the switch SW1 is checked in step S141. If the shutter switch SW1 is ON, the flow returns to step S125, and the system controller 50 prepares for the next image sensing process. On the other hand, if the shutter switch SW1 is OFF, the flow returns to step S103, and the system controller 50 ends a series of image sensing operations.

Figure 4:
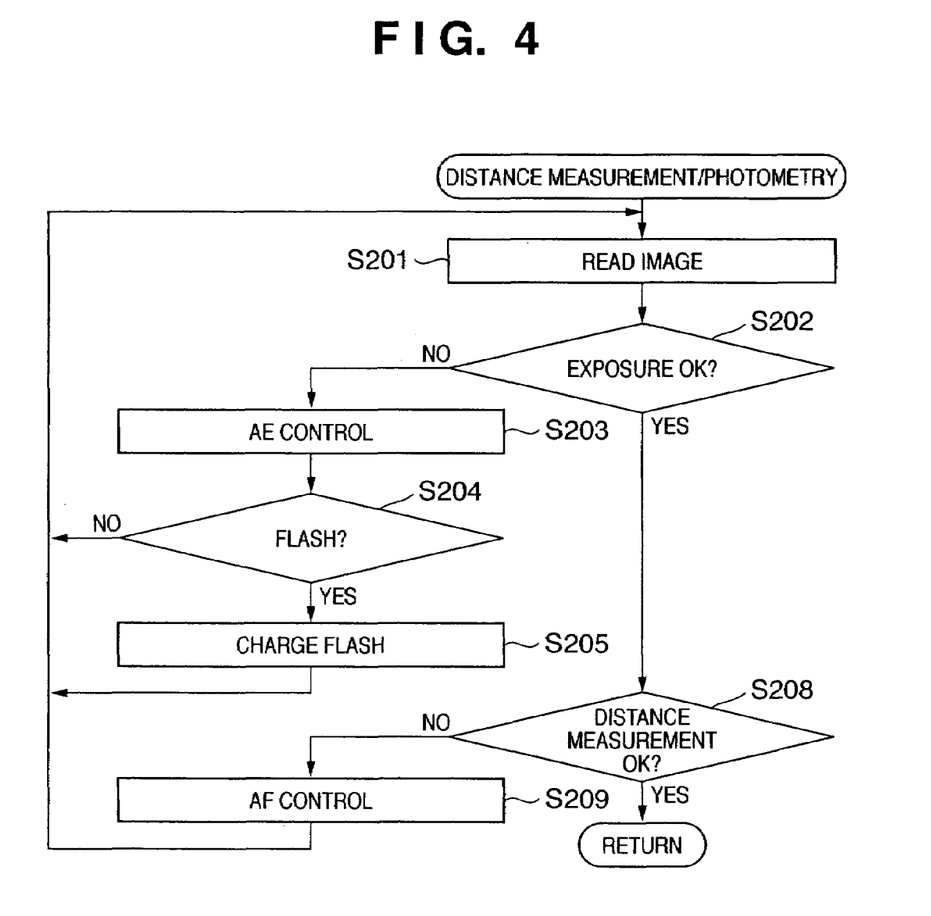
FIG. 4 is a flow chart of a distance measurement/photometry routine according to the embodiment of the present invention.

FIG. 4 is a detailed flow chart of the distance measurement/photometry process in step S122 in FIG. 3. The system controller 50 reads out a charge signal from the image sensing device 14, and sequentially inputs sensed image data to the image processor 20 via the A/D converter 16 (step S201). Using this sequentially read image data, the image processor 20 executes predetermined calculations used in the TTL AE process, EF process, and AF process.

Note that these processes extract a required number of specific portions from all sensed pixels as needed and use them in calculations. In this way, in the TTL AE, EF, AWB, and AF processes, optimal calculations can be made for respective different modes such as a center emphasis mode, average mode, and evaluation mode.

The system controller 50 executes AE control using the exposure controller 40 using the calculation results of the image processor 20 (step S203) until an appropriate exposure (AE) value is obtained (until YES is determined in step S202). The flow then advances to step S204, and the system controller 50 checks using measurement data obtained by the AE control if flash light is required (step S204). If flash light is required (YES in step S204), the system controller 50 sets a flash flag, and charges the flash 48 (step S205).

If it is determined that an appropriate exposure (AE) value is obtained (YES in step S202), the measurement data and/or setup parameters are stored in the internal memory of the system controller 50 or the memory 52. The system controller 50 then executes a distance measurement process (AF) using the calculation results of the image processor 20 and the measurement data obtained by the AE control, and repeats AF control using the distance measurement controller 42 (step S209) until an in-focus point is detected (while NO is determined in step S208).

If it is determined that an in-focus point is detected as a result of distance measurement (AF) (YES in step S208), the measurement data and/or setup parameters are stored in the internal memory of the system controller 50 or the memory 52, thus ending the distance measurement/photometry process routine (step S122).

Figure 5:
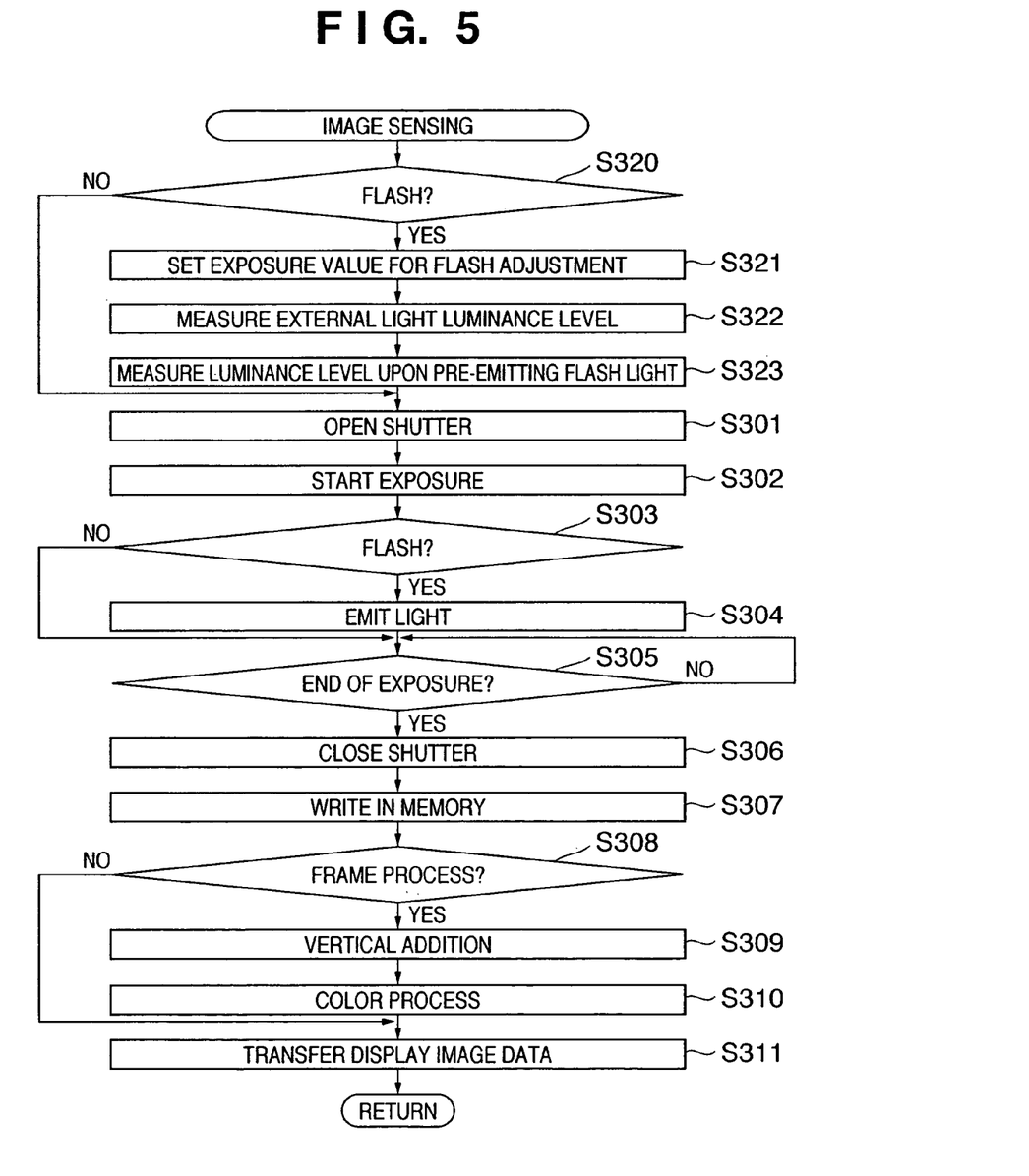
FIG. 5 is a flow chart of an image sensing routine according to the embodiment of the present invention.

FIG. 5 is a detailed flow chart of the image sensing process in step S129 in FIG. 3.

The system controller 50 determines in step S320 whether or not the flash 48 is required to emit light by checking if the flash flag is set. If no flash light is required (NO in step S320), the flow jumps to step S301; otherwise (YES in step S320), the system controller 50 controls the exposure controller 40 on the basis of the photometry data stored in its internal memory or the memory 52 to open the shutter 12 having the diaphragm function in accordance with the aperture value, so as to expose the image sensing device 14 (step S321), and to measure an external light luminance level without flash emission (step S322). Subsequently, pre-emission is made, and a luminance level upon emitting flash light is measured (step S323). The emission amount is calculated from the obtained two photometry data, and is stored in the internal memory of the system controller 50 or the memory 52. The control then enters an actual image sensing process.

The system controller 50 controls the exposure controller 40 in accordance with the photometry data stored in its internal memory or the memory 52 to set the shutter 12 having the diaphragm function to an aperture value corresponding to the obtained photometry data, thus exposing the image sensing device 14 (steps S301 and S302).

The system controller 50 determines in step S303 whether or not the flash 48 is required by checking if the flash flag is set. If the flash 48 is required, the system controller 50 controls the flash 48 to emit light in accordance with the flash emission amount stored in its internal memory or the memory 52 in step S323 (step S304). The system controller 50 waits for the end of exposure of the image sensing device 14 in accordance with the photometry data (step S305), and closes the shutter 12 (step S306). Then, the system controller 50 reads out a charge signal from the image sensing device 14, and writes sensed image data in the image data memory 30 via the A/D converter 16, image processor 20, and memory controller 22, or directly from the A/D converter 16 via the memory controller 22 (step S307).

If a frame process is required in accordance with the set image sensing mode (YES in step S308), the system controller 50 reads out image data written in the image data memory 30 via the memory controller 22 and image processor 20 as needed, and sequentially executes a vertical addition process (step S309) and color process (step S310). After that, the system controller 50 writes the processed image data in the image data memory 30.

The system controller 50 reads out image data from the image data memory 30, and transfers display image data to the image display memory 24 via the memory controller 22 (step S311). Upon completion of a series of processes, the system controller 50 ends the image sensing process routine (step S129).

Figure 6:
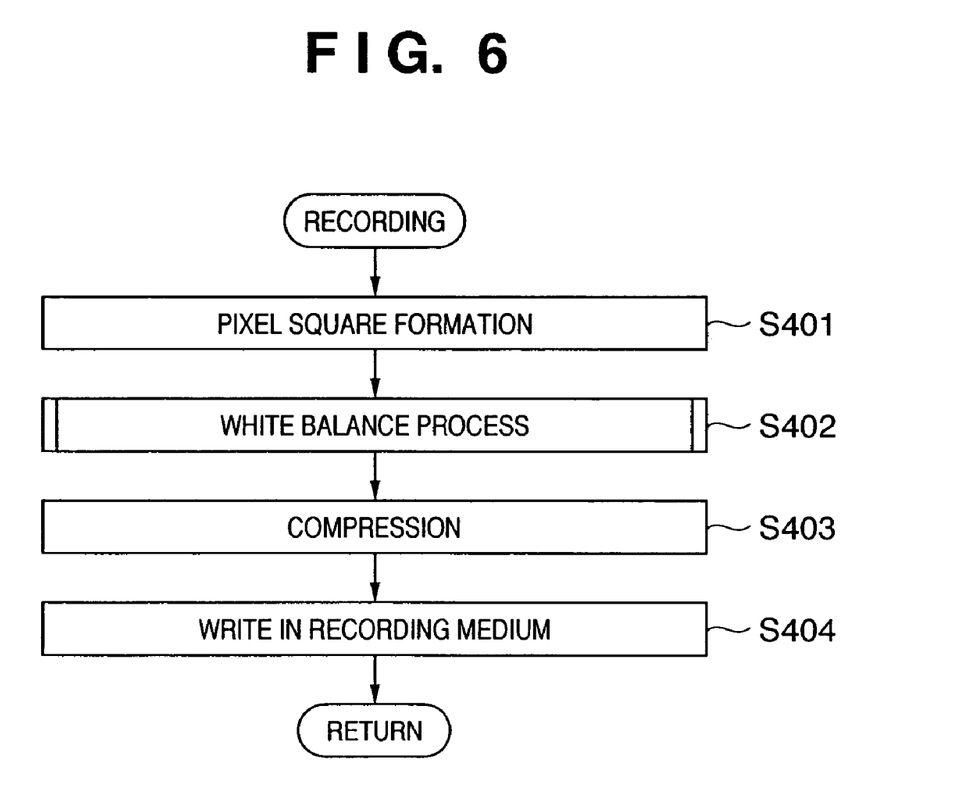
FIG. 6 is a flow chart of a recording routine according to the embodiment of the present invention.

FIG. 6 is a detailed flow chart of the recording process in step S134 in FIG. 3. The system controller 50 reads out sensed image data written in the image data memory 30 using the memory controller 22 and image processor 20 as needed, and executes a pixel square formation process for interpolating the aspect ratio of the image sensing device to 1:1 (step S401). The system controller 50 then writes the processed image data in the image data memory 30.

In step S402, the system controller 50 reads out image data written in the image data memory 30 and executes a white balance process. Details of the white balance process executed in step S402 will be described later with reference to FIG. 7.

The system controller 50 then reads out image data written in the image data memory 30 and executes an image compression process according to the set mode using the compression/expansion circuit 32 (step S403). The system controller 0.50 writes the compressed image data in the recording medium 200 or 210 such as a memory card, compact flash® card, or the like via the interface 90 or 94 and the connector 92 or 96 (step S404). Upon completion of the write process in the recording medium, the system controller 50 ends the recording process routine (step S134).

Figure 7:
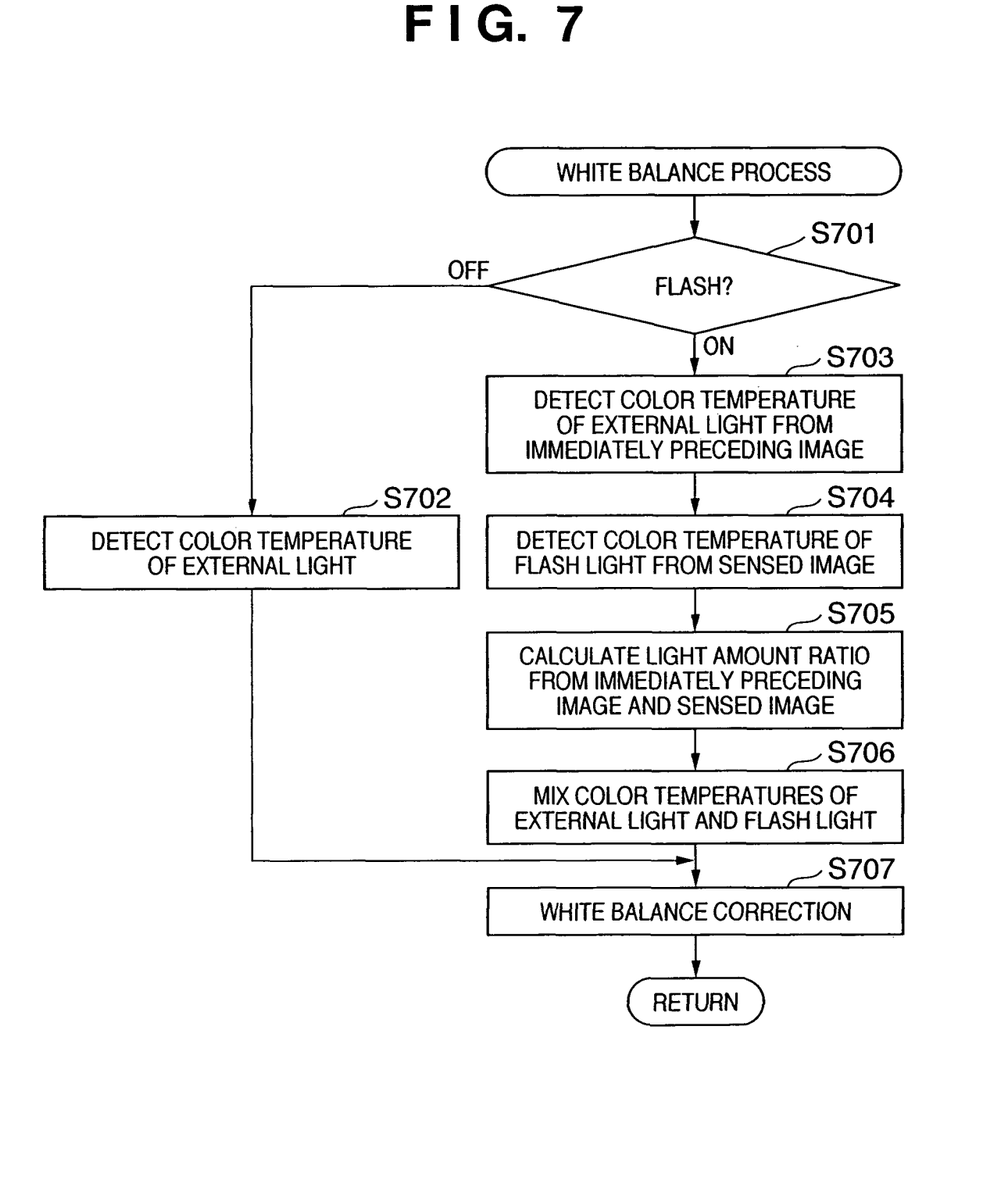
FIG. 7 is a flow chart of a white balance process routine according to the embodiment of the present invention.

FIG. 7 is a detailed flow chart of the white balance process in step S402 in FIG. 6.

The system controller 50 checks if flash light has been emitted (step S701). If no flash light has been emitted, the system controller 50 detects the color temperature of external light from the sensed image (step S702), and executes a known white balance process according to the detected color temperature in step S707. On the other hand, if flash light has been emitted, the system controller 50 detects the color temperature of external light from the immediately preceding image before image sensing which is recorded in step S128 in FIG. 3 (step S703), and detects the color temperature of flash light from the image (actually sensed image) obtained by the actual image sensing process in step S129 (step S704). In this case, the color temperature of flash light is detected as follows. That is, only an image portion/portions around the color temperature (e.g., 7000 to 8000K) corresponding to flash light of the entire image (actually sensed image to be recorded in the recording medium 200 or 210) undergoes white detection which extracts colors included in a white detection range based on the black body locus, the color temperatures of the detected colors are averaged, and the obtained (averaged) color temperature is determined as that of the flash light.

Furthermore, the luminance levels of the immediately preceding image and actually sensed image are obtained, and the brightness ratio between the external light and flash light is calculated based on the obtained luminance levels (step S705). The brightness can be, e.g., light amounts, light levels (Y), AE values, or combination thereof. Note that the immediately preceding image may have different exposure conditions such as an exposure time, aperture value, and the like from those of the actually sensed image, since an image sensed for the through display is directly stored. Although the photoelectric conversion characteristics of an ideal image sensing device 14 show direct proportion, the ratio between the luminance level and output charge amount varies depending on luminance levels in practice. Hence, charge signals are output at different ratios in correspondence with the luminance level obtained based on only the external light and that obtained upon sensing an image while emitting flash light, and the sensitivity varies. Furthermore, when respective pixels are covered by color filters, the photoelectric conversion characteristics also often vary depending on colors. For this reason, differences such as an exposure condition difference, sensitivity difference, sensitivity differences for respective colors (spectral sensitivity differences), and the like must be taken into account.

In step S706, the external light color temperature and flash light color temperature are weighted on the basis of the light amount ratio calculated in step S705, and a final color temperature is calculated by calculating the average of the sum of the obtained values. The actually sensed image undergoes known white balance correction corresponding to the calculated color temperature (step S707), thus ending the process.

Figure 8:
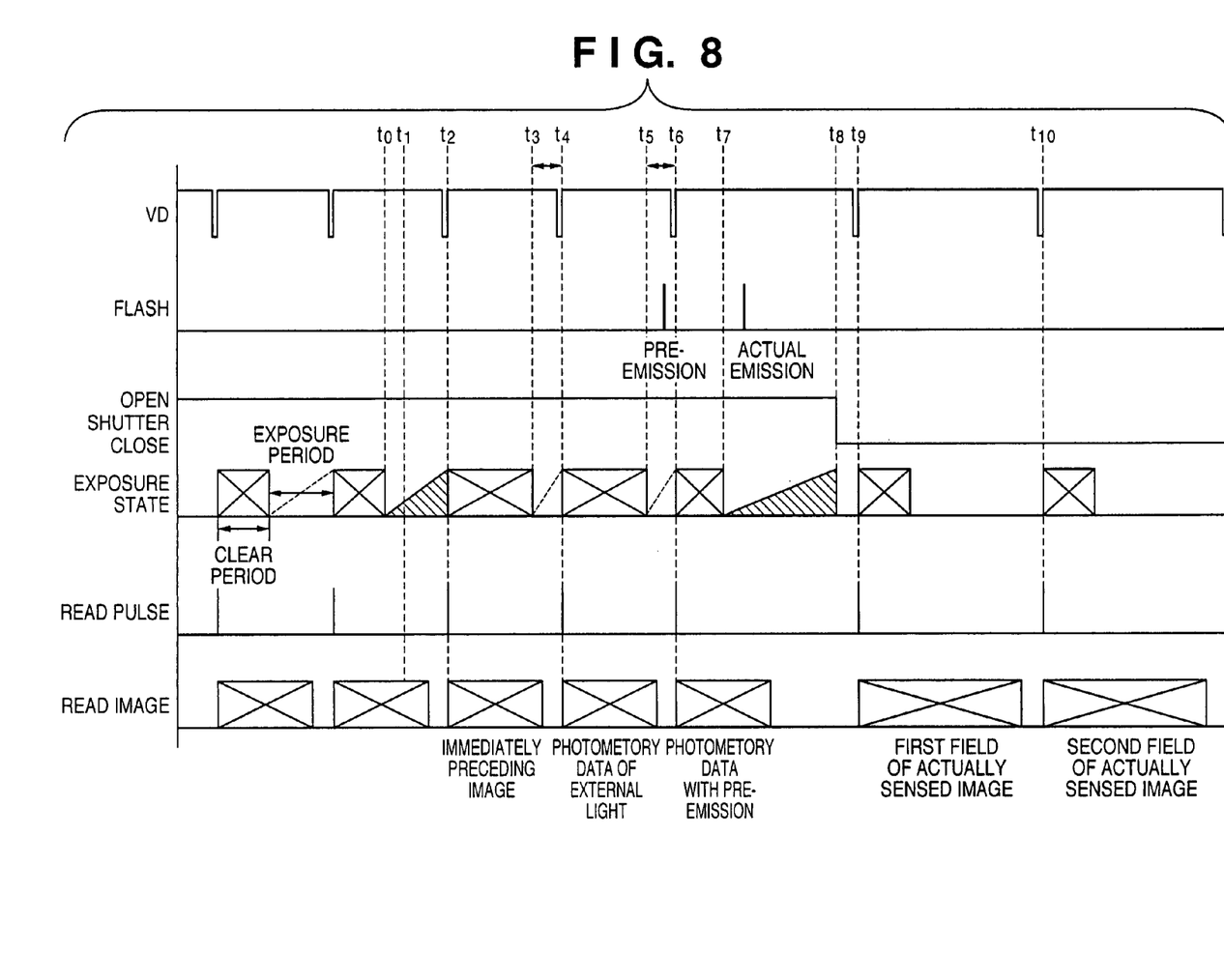
FIG. 8 is a timing chart of an image sensing sequence according to the embodiment of the present invention.

FIG. 8 is a detailed timing chart from when the immediately preceding image is captured (step S128) until the image sensing process is completed (step S129), when an image is sensed while emitting flash light in accordance with an image sensing instruction issued upon depression of the switch SW2 in step S125 in FIG. 3.

When an image sensing instruction issued upon depression of the switch SW2 is detected (t1), the system controller 50 captures an image (immediately preceding image) obtained from the image sensing device 14 at that time (corresponding to step S128 in FIG. 3). When the image sensing device 14 comprises a CCD and has an electronic shutter function, the shutter 12 is set in an open state to display, e.g., a through image on the image display unit 28, and a charge signal accumulated by exposing the image sensing device 14 from the end of a clear period of respective pixels until the start of the next clear period is read out, thus obtaining an image signal. As shown in FIG. 8, since the clear period starts in response to a vertical synchronization signal VD, the immediately preceding image in this case is obtained by transferring charges accumulated on respective pixels during a period from the previous clear period end time t0 to time t2 to a transfer CCD in response to read pulses synchronized with the vertical synchronization signal VD at time t2. Furthermore, the clear period starts at time t2, and the remaining charges on the respective pixels after transfer are cleared. The charges transferred to the transfer CCD are sequentially transferred and read out in the vertical and horizontal directions by a known method until the next image read process starts.

At time t2, the exposure controller 40 opens the shutter 12 having the diaphragm function in accordance with the aperture value on the basis of the photometry data stored in the internal memory of the system controller 50 or the memory 52 (step S321 in FIG. 5). At time t3, the clear period ends, and charge accumulation on the image sensing device 14 starts. Upon outputting a read pulse of exposure end at time t4, a charge signal begins to be read out from the image sensing device 14, and sensed image data is written in the memory 30 via the A/D converter 16, image processor 20, and memory controller 22 or directly from the A/D converter 16 via the memory controller 22. Also, that data is stored in the internal memory of the system controller 50 or the memory 52 as external light photometry data (step S322 in FIG. 5). Likewise, during the next exposure period (t5 to t6), the flash is controlled to emit light in a predetermined amount, pre-emission photometry data is also stored in the internal memory of the system controller 50 or the memory 52, and an actual emission amount is calculated from the difference between the two photometry data (step S323 in FIG. 5).

After the actual emission amount is determined, the exposure controller 40 opens the shutter 12 having the diaphragm function in accordance with the aperture value on the basis of the external light photometry data and pre-emission photometry data stored in the internal memory of the system controller 50 or the memory 52 (step S301 in FIG. 5), so as to set the exposure conditions for the actual image sensing process.

Upon completion of the setup of the exposure conditions, when the clear period of the image sensing device 14 ends (t7), charge accumulation starts. At this time, the flash is controlled to emit light in accordance with the flash emission amount stored in the internal memory of the system controller 50 or the memory 52 (step S304 in FIG. 5). After an elapse of a predetermined period of time (t8), the shutter 12 is closed (step S306 in FIG. 5). After the shutter 12 is closed, a read pulse for the first field is output (t9) to read out a charge signal from the image sensing device 14, and sensed image data is then written in the image data memory 30 via the image sensing device 14, A/D converter 16, image processor 20, and memory controller 22 or directly from the A/D converter 16 via the memory controller 22. Also, that data is stored in the internal memory of the system controller 50 or the memory 52. Likewise, a read pulse for the second field is output (t10), and sensed image data is written in the memory 30. As a result, two field images are written, i.e., a frame image for all pixels is stored.

Using the immediately preceding image and the first and second field images obtained by the aforementioned timing control, the processes in steps S703 to S706 in FIG. 7 are executed.

In the above embodiments, the color temperature and luminance level of external light are obtained from the immediately preceding image which is a through image (displayed on the EVF) sensed after the shutter switch SW2 is turned ON and before an actual image sensing starts. Alternatively, the color temperature and luminance level of external light may be regularly obtained from through images after the shutter switch SW is turned on. Further, a ratio of brightness between the flash light and external light may be obtained by an external light sensor.

In this way, even when an image is sensed by emitting flash light, color balance correction of the sensed image can be appropriately attained.

OTHER EMBODIMENT

The present invention can be applied to a system constituted by a plurality of devices (e.g., image processing apparatus such as a host computer, interface, camera head) or to an apparatus comprising a single device (e.g., digital camera, digital video camera).

Further, the object of the present invention can also be achieved by providing a storage medium storing program codes for performing the aforesaid processes to a computer system or apparatus (e.g., a personal computer), reading the program codes, by a CPU or MPU of the computer system or apparatus, from the storage medium, then executing the program.

In this case, the program codes read from the storage medium realize the functions according to the embodiment, and the storage medium storing the program codes constitutes the invention.

Further, the storage medium, such as a floppy disk, a hard disk, an optical disk, a magneto-optical disk, CD-ROM, CD-R, a magnetic tape, a non-volatile type memory card, and ROM, and computer network, such as LAN (local area network) and WAN (wide area network), can be used for providing the program codes.

Furthermore, besides aforesaid functions according to the above embodiment are realized by executing the program codes which are read by a computer, the present invention includes a case where an OS (operating system) or the like working on the computer performs a part or entire processes in accordance with designations of the program codes and realizes functions according to the above embodiment.

Furthermore, the present invention also includes a case where, after the program codes read from the storage medium are written in a function expansion card which is inserted into the computer or in a memory provided in a function expansion unit which is connected to the computer, CPU or the like contained in the function expansion card or unit performs a part or entire process in accordance with designations of the program codes and realizes functions of the above embodiment.

In a case where the present invention is applied to the aforesaid storage medium, the storage medium stores program codes corresponding to the flowcharts shown in FIGS. 2 to 7 described in the embodiment.

The present invention is not limited to the above embodiments and various changes and modifications can be made within the spirit and scope of the present invention. Therefore to apprise the public of the scope of the present invention, the following claims are made.

What is claimed is:

1. A method of controlling an image sensing apparatus, which has an image sensor, a flash light used to illuminate an object with light, and an image sensing instruction unit, comprising:

storing a first image sensed by the image sensor in a storage device;

sensing a second image by the image sensor while causing the flash light to emit light in response to an image sensing designation by the image sensing instruction unit;

calculating a brightness of the first image and a brightness of the second image;

calculating a color temperature of light illuminated when sensing the second image on the basis of color temperature of external light illuminated when sensing the first image, the brightness of the first image and the brightness of the second image;

performing white balance processing for the second image on the basis of the color temperature of the second image; and outputting the white-balance-processed second image as a sensed image sensed by the image sensor in response to the image sensing designation of the image sensing instruction unit, wherein the first image is sensed by the image sensor in a period between the image sensing designation and the emission of the flash light.

2. The method according to claim 1, wherein said calculating of the color temperature includes detecting a ratio of brightness between the first image and the second image, and calculating the color temperature of the second image on the basis of the detected ratio.

3. A computer readable medium for storing a program which has a program code for implementing a control method of claim 1, and can be executed by an information processing apparatus.

4. The method according to claim 1, wherein said first image is one of a plurality of images used for displaying the image sensed by the image sensor before sensing the second image.

5. A controller for an image sensing apparatus, which has an image sensor, a flash light used to illuminate an object with light, and an image sensing instruction unit, comprising:

a storage unit which stores a first image sensed by the image sensor;

an image sensing controller which controls to sense a second image while causing the flash light to emit light in response to an image sensing designation by the image sensing instruction unit;

a brightness calculation unit which calculates a brightness of the first image and a brightness of the second image;

a color temperature calculation unit which calculates a color temperature of light illuminated when sensing the second image on the basis of color temperature of external light illuminated when sensing the first image, the brightness of the first image and the brightness of the second image;

a processor unit which performs white balance processing for the second image on the basis of the color temperature of the second image; and an output unit which outputs the white-balance-processed second image as a sensed image sensed by the image sensor in response to the image sensing designation of the image sensing instruction unit, wherein the first image is sensed by the image sensor in a period between the image sensing designation and the emission of the flash light.

6. The controller according to claim 5, wherein said color temperature calculation unit includes a unit which detects a ratio of brightness between the first image and the second image, and calculates the color temperature of the second image on the basis of the detected ratio.

7. A computer readable medium for storing a program, which can be executed by an information processing apparatus, that makes the information processing apparatus, which executes the program, function as a controller of claim 5.

8. The controller according to claim 5, wherein said first image is one of a plurality of images used for displaying the image sensed by the image sensor before sensing the second image.

* * * * *